May 19, 1936.  J. P. KRIECHBAUM  2,041,645
THERMOSTATIC SWITCHING MECHANISM
Original Filed June 30, 1933  2 Sheets-Sheet 1
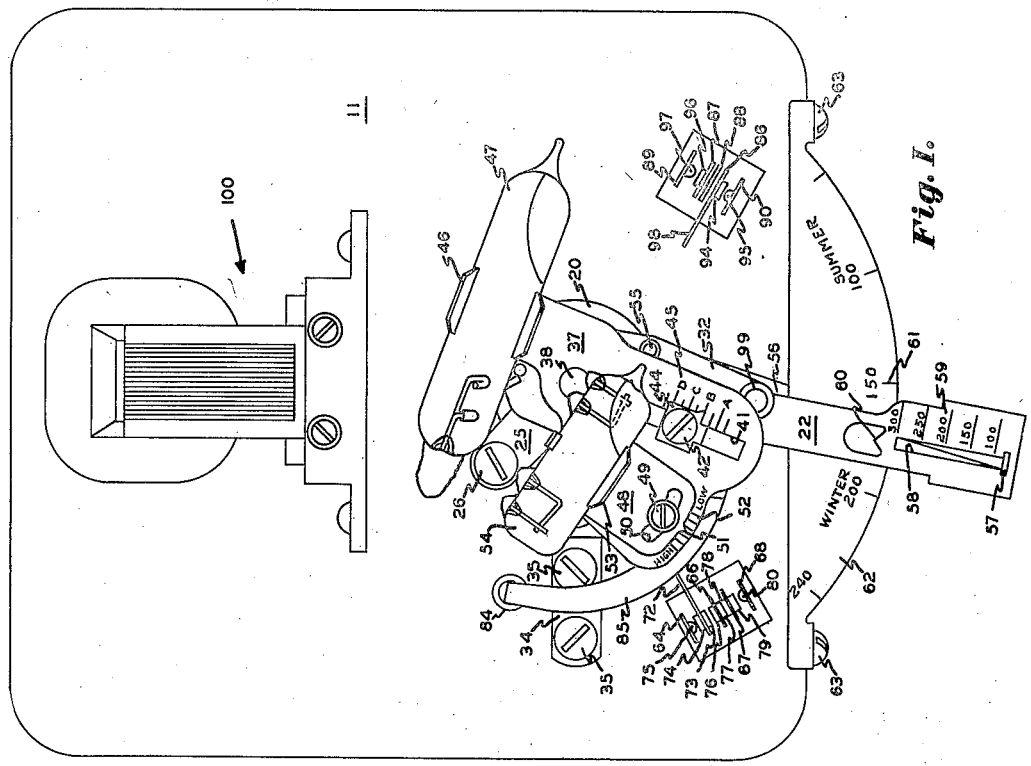
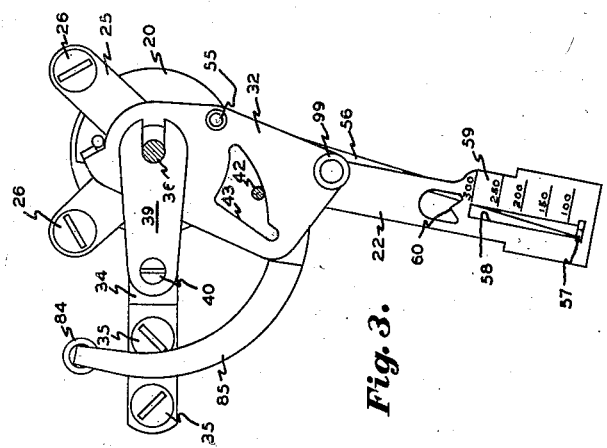
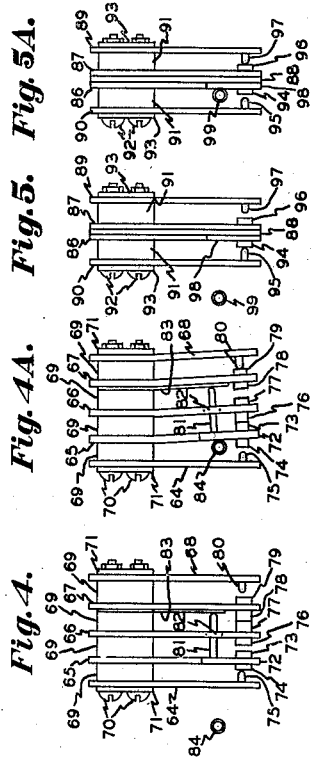
Inventor
John P. Kriechbaum
By George H. Fisher
Attorney

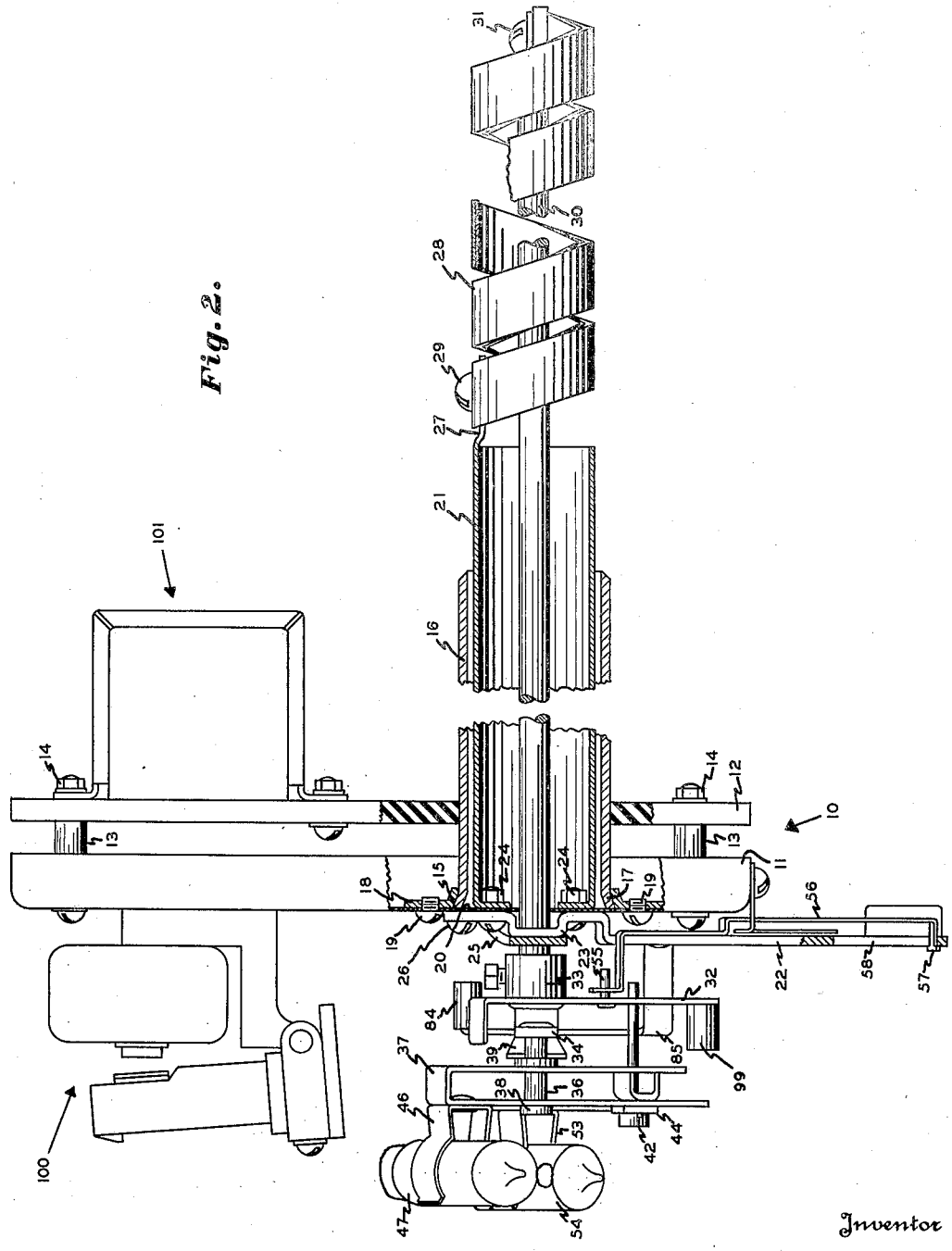

Patented May 19, 1936

2,041,645

UNITED STATES PATENT OFFICE 2,041,645

THERMOSTATIC SWITCHING MECHANISM

John P. Kriechbaum, Minneapolis, Minn., assignor to Minneapolis-Honeywell Regulator Company, Minneapolis, Minn., a corporation of Delaware Original application June 30, 1933, Serial No. 678,429. Divided and this application May 14, 1934, Serial No. 725,459

20 Claims. (Cl. 200—139)

The present invention relates to an improved switching mechanism, preferably operated in response to changes in temperature, and having particular utility in the field of automatic temperature control systems.

One of the objects of the invention is the provision of a control mechanism wherein a first member to be controlled is operated in accordance with changes in any desired condition or force, there being means for adjusting the operation of the controlled member by the condition or force, together with a second controlled member which is moved to a new position upon movement of the adjusting means to a predetermined position.

More specifically, an object of the invention is the provision of two switching means, one of which is positioned in accordance with the changes in a condition together with means for adjusting the value of the condition at which the first switching means will be operated to its new position and mechanism associated with the second switching means and the adjusting means whereby the second switching means will be moved to a new position upon operation of the adjusting means to a predetermined position.

In the specific embodiment of the invention to be hereinafter disclosed a thermostatic actuator controls a first switch in accordance with temperature changes, there being a means for adjusting the temperature at which the switch will be moved to open and closed position, and the adjusting means being so associated with a double circuit switch that the double circuit switch will be moved to a new position upon movement of the adjusting means to a predetermined or extreme position. Such a device has particular utility in the field of automatic controls where it is desired to change the operation of the system during the summer with the least number of manual operations.

A further object of the invention is the provision of a control device including an actuator one end of which is relatively stationary and the other end of which operates a controlled member, and means for adjusting the relatively stationary end of the actuator to vary the value of the condition at which the controlled member will be moved to a predetermined position, together with indicating means controlled by the conjoint action of the actuator and the adjusting means whereby the value of the condition will be indicated irrespective of the position of the adjusting means.

More specifically, an object of the invention is the provision of a thermostatic switch of that type in which one end of the thermostatic actuator moves the switch conformably to temperature changes and the other end is adjustable to vary the temperature at which the switch will be moved to open and closed position and further providing indicating means which is conjointly controlled by the thermostatic actuator and the adjusting means so that the indicating means always indicates the value of the temperature to which the thermostatic element responds irrespective of the adjustment of the thermostatic element.

Other objects of the invention will be found in the drawings, the description and in the appended claims.

This application is a division of my application entitled "Control system and control mechanism therefor", Serial No. 678,429, filed June 30, 1933.

For a more complete understanding of the invention, reference should be had to the following description and accompanying drawings, in which:

Fig. 1 is a front view of the switching mechanism of the present invention,

Fig. 2 is a side view of the switching mechanism of Fig. 1 with certain parts in section and other parts broken away in order to show the details of the device more clearly, Fig. 3 is a front view of the switching mechanism of Fig. 1 with the front part thereof and surrounding parts removed, Fig. 4 is a side view of the reversing switching mechanism in its winter position, as shown in Fig. 1, Fig. 4A is a view similar to Fig. 4 but with the reversing switching mechanism shown in its summer position, Fig. 5 is a view of the over-run contacting mechanism in its cold position as shown in Fig. 1, and Fig. 5A is a similar view of the over-run contacting mechanism but in its hot position.

Referring first to Figs. 1, 2, and 3, the switching mechanism of the instant invention includes a base generally indicated at 10 which base comprises a flanged base plate 11 and a panel 12 of heat-insulating material, the panel 12 being spaced from the base plate 11 by means of spacing sleeves 13 and these parts being held together by means of screw and nut assemblies indicated at 14. The base plate 11 is provided with a circular opening 15. A cylindrical mounting member 16 which is provided with an expanded end 17 abuts the periphery of opening 15 at the rear side thereof, and extends rearwardly through panel 12. A collar 18 surrounds the expanded end 17 of cylindrical mounting member 16 and is secured to base plate 11 by means of screws 19 whereby cylindrical mounting member 16 is rigidly secured to the base plate 11. A circular plate 20 is placed in the opening 15 formed in base plate 11 and abuts the end of expanded end 17 of cylindrical mounting member 16 which end also abuts the rear side of base plate 11. A tubular member 21 placed within and concentric to cylindrical mounting member 16 abuts the rear side of circular plate 20. An adjusting handle 22 is formed with an upraised portion 23 and abuts the front side of circular plate 20. Screws and nuts 24 secure tubular member 21, circular plate 20, and adjusting handle 22 together in a unitary structure. A bracket 25, which is secured to base plate 11 by means of screws 26, abuts the upraised portion 23 of adjusting handle 22 and presses circular plate 20 against the expanded end 17 of cylindrical mounting member 16 whereby the circular plate 20 and associated parts may be rotated but are prevented from moving longitudinally. The bracket 25 additionally frictionally clamps adjusting handle 22 in any position to which it is manually moved. The outer free end of tubular member 21 is provided with an extension 27 to which one end of a bi-metallic helix 28 is secured as indicated at 29. The other end of bi-metallic helix 28 is secured to a torsion rod 30, as indicated at 31, the torsion rod extending frontwardly through the bi-metallic helix 28, the tubular member 21, the circular plate 20, the up-raised portion 23 of adjusting handle 22, and bracket 25 and terminates a short distance in front of base plate 11. A cam plate 32 is secured to the end of torsion rod 30 by any suitable means such as the collar 33.

The apparatus thus far described operates to position the cam plate 32 in accordance with temperature changes to which the bi-metallic helix 28 is subjected and the temperature at which cam plate 32 will be moved to a predetermined position may be varied by operating adjusting handle 22 to rotate tubular member 21 and the relatively fixed end of bi-metallic helix 28.

A bracket 34 which is secured to base plate 11 by means of screws 35 carries a stud-shaft 36 which extends forwardly from the base plate 11 and is in alignment with torsion rod 30. A mercury switch carrier 37 is mounted upon stud-shaft 36 and is frictionally pressed against the enlarged head 38 thereof by means of a leaf-spring 39 which is carried by and secured to bracket 34 by means of a screw 40. The mercury switch carrier 37 is provided with a slot 41 which receives a screw 42 that extends into an irregular opening 43 which is formed in cam plate 32. The screw 42 serves to clamp a pointer 44 against carrier 37 which pointer cooperates with indicia 45 carried by carrier 37. By reason of the irregular shape of slot 43, movement of screw 42 in slot 41 will result in a variable amount of lost motion between cam plate 32 and carrier 37, the purpose of which lost motion will be hereinafter described.

A mercury switch clip 46 is secured to the upper portion of carrier 37 and holds a mercury switch 47. A mercury switch carrying plate 48 is pivotally mounted upon carrier 37 and may be adjusted thereon by means of screw 49 which passes through an elongated slot 50 formed in plate 48 and enters the carrier 37. A pointer 51 formed on plate 48 cooperates with indicia 52 formed on carrier 37. The plate 48 carries a mercury switch clip 53 which supports a mercury switch 54. The mercury switch 54 in this particular instance is shown as a double-ended mercury switch adapted to make one circuit and break another upon tilting in either direction.

A crank pin 55 which is secured to cam plate 32 at a point remote from its mounting on shaft 30 actuates an indicating lever 56 which has a pointer 57 that slides in a slot 58 formed in the lower portion of adjusting handle 22 and cooperates with indicia 59 graduated in the lower portion of adjusting handle 22. The adjusting handle 22 is further formed with an opening that provides a pointer 60 which cooperates with indicia 61 carried by a scale plate 62 which in turn is secured to base plate 11 by screws 63.

The summer reversing switching mechanism 15 (shown in more detail in Figs. 4 and 4A) comprises a switching assembly composed of flexible switch arms 64, 65, 66, 67, and 68 which are spaced one from another by blocks of insulating material 69 and are held together by means of screws and nuts 70, there being a piece of insulating material 71 between the heads of the screws and the cooperating nuts and the adjacent flexible switch arms. Switch arm 65 is provided with a lateral extension 72 and in addition carries two contacts 73 and 74, the latter of which cooperates with a contact 75 carried by flexible switch arm 64. Contact 73 cooperates with a contact 76 carried by switch arm 66 and a second contact 77 carried thereby cooperates with a contact 78 carried by switch arm 67. A second contact 79 carried by switch arm 67 cooperates with a contact 80 carried by switch arm 68. A pin 81 which is secured to switch arm 65 extends through an aperture 82 in switch arm 66 and engages a piece of insulating material 83 which lies against switch arm 67. The summer-winter switching mechanism normally assumes the position shown in Fig. 4 (this is the winter position) wherein contact 74 is in engagement with contact 75 and contact 77 is in engagement with contact 78. The lateral extension 72 is adapted to be engaged by an insulating sleeve 84 which is carried by an extension 85 that is integral with or secured to adjusting handle 22. Upon proper manipulation of adjusting handle 22, insulating sleeve 84 is brought into engagement with lateral extension 72 as shown in Fig. 4A whereupon contact 74 is moved out of engagement with contact 75 and contact 73 is moved into engagement with contact 76. The pin 81 engages insulating material 83 and thereby moves switch arm 67 in such manner that its contact 78 disengages contact 77 and its contact 79 moves into engagement with contact 80. This is the summer position of the switching mechanism of Fig. 4. It will be noted that this switching mechanism amounts to a double pole, double throw reversing switch and it will be readily appreciated and should be understood that a larger or smaller number of switches can be utilized depending upon the particular circuits which it is desired to control. The over-run switching mechanism shown in Figs. 5 and 5A comprises two switch arms 86 and 87 between which is interposed a piece of insulating material 88. Switch arms 89 and 90 are spaced from switch arms 87 and 86 by blocks of insulating material 91 and the assembly is held together by means of screw and nut assemblies 92, there being a piece of insulating material 93 placed between the heads of screws and between the nuts and the adjacent switch arms 89 and 90. Switch arm 86 carries a contact 94 which cooperates with a contact 95 carried by switch arm 90. In a similar manner switch arm 87 carries contact 96 which cooperates with a contact 97 carried by switch arm 89. The switch arm 86 is provided with a lateral extension 98 which is adapted to be engaged by an insulating sleeve 99 carried by cam plate 32. In Fig. 5, the over-run contacts are shown in their normal position in which contact 94 is in engagement with contact 95 and contacts 96 and 97 are disengaged. Upon engagement of lateral extension 98 by insulating sleeve 99, contact 94 will be moved out of engagement with contact 95 and contact 96 will be moved into engagement with contact 97.

As heretofore explained, the torsion rod 30 is rotated by bi-metallic helix 28 in conformity with changes in the temperature to which bi-metallic helix 28 is subjected. With the parts in the position shown, the complete switching mechanism is set for winter operation with the pointer 60 indicating that the apparatus is so arranged that mercury switch 47 will be moved to closed position when a temperature of approximately 175° is reached and with the pointer 51 set in an intermediate position indicating that the mercury switch 54 will be tilted to its hot position upon a medium rise in temperature above the 175° setting of the pointer 60. The temperature indicating pointer 57 indicates that the temperature to which bi-metallic helix 28 responds is below 100°. Now if the temperature to which bi-metallic helix 28 responds begins to rise, cam plate 32 will be rotated in a counter-clockwise direction as viewed in Figs. 1 and 3. Crank 55 will thereupon raise lever 56 and temperature indicating pointer 57 to indicate the rise in temperature and at the same time the screw 42 and carrier 37 will remain stationary by reason of the irregular opening 43 until the lost motion between the cam plate 32 and the screw 42 is taken up. If the temperature continues to rise, the edge of cam plate 32 which defines the left hand edge of opening 43 will engage screw 42 and turn carrier 37 in a counter-clockwise direction as viewed in Fig. 1. When temperature indicating pointer 57 indicates a temperature of about 175°, the carrier 37 will have been rotated to such a position that the circuit through mercury switch 47 will be closed. Upon a medium further rise in temperature, say about 25 degrees Fahrenheit, the mercury switch 54 will be moved to a position in which its cold contacts will be opened and its hot contacts will be closed. If the temperature rise should become excessive, resulting in excessive rotation of cam plate 32, the insulating sleeve 99 carried by cam plate 32 will engage the lateral extension 98 of switch arm 86 with the result that contact 94 will be disengaged from contact 95 and contact 96 will be moved into engagement with contact 97.

Upon a temperature fall, the insulating sleeve 99 which is carried by cam plate 32 will first disengage lateral extension 98 (if the temperature has formerly risen to such a degree as to cause engagement of sleeve 99 with extension 98) and screw 42 will immediately disengage the left hand edge formed by the opening 43 in cam plate 32. Upon continued temperature fall, the lost motion between screw 42 and the opening 43 will be taken up and the screw 42 will be engaged by the right hand edge formed in cam plate 32 by the opening 43 whereupon carrier 37 will begin to rotate in a clockwise direction as viewed in Fig. 1. Mercury switch 54 will first be moved to the position shown in Fig. 1 and thereafter mercury switch 47 will be moved to its open position as shown in Fig. 1. The temperature at which mercury switch 47 is moved to its open position as shown in Fig. 1 will be somewhat lower than the 175° at which pointer 60 is set and the amount of this deviation from 175° will depend upon the amount of lost motion between screw 42 and cam plate 32 as determined by the position of screw 42 in slot 41. The irregular shape of opening 42 is provided in order that the change in differential between the opening and closing movements of mercury switch 47 will remain substantially constant for equal vertical adjustments of screw 42 in slot 41.

It is necessary that the pointer 57 cooperate with indicia carried by the adjusting handle 22 or some other part moved in accordance with the movements of adjusting handle 22 because this adjusting handle varies the position of the relatively stationary end of bi-metallic helix 28. By the arrangement shown, the adjusting handle 22 not only changes the basic temperature setting of the device but by reason of its cooperation with the pointer 57 which is moved by the relatively free end of bi-metallic helix 28 an accurate temperature indication can be obtained irrespective of the position or setting of the adjusting handle 22. The indicia A, B, C, D indicated at 45 which cooperate with the pointer 44 indicate the amount of lost motion between screw 42 and the cam plate 32 which in turn is an indication of the differential at which mercury switches 47 and 54 will be operated. The pointer 51 and cooperating indicia 52 make it possible to obtain an approximation of the setting of mercury switch 54 in respect to the setting of mercury switch 47.

When it is desired to operate the reversing switching mechanism, as during the summer time, the adjusting handle 22 is moved to its extreme right hand position as viewed in Fig. 1 with the result that insulating sleeve 84 is brought into engagement with lateral extension 72 as previously explained so as to operate the reversing switching mechanism.

From the foregoing description, it will be seen that this invention provides a novel manner of operating an auxiliary switching mechanism, such as a reversing switching mechanism, whenever the adjusting means of the device is moved to a predetermined position. The invention also provides an apparatus in which the temperature can be indicated, irrespective of the setting of the instrument, even though the changes in the setting of the instrument are obtained by repositioning the relatively stationary end of the actuator. In addition, the apparatus likewise provides many other specific improvements in the arrangement and cooperation of the various parts.

The base plate 11 may, if desired, support an electromagnetic relay generally indicated at 100 and in a similar manner the panel 12 may carry a transformer generally indicated at 101.

It will be readily seen that the switching mechanism of the present invention may be changed in many of its details by those skilled in the art without departing from the spirit of the invention, and it should therefore be understood that I am only to be limited in view of the appended claims.

I claim as my invention:

1. In combination, an actuator, a switch carrier, an adjustable lost motion connection between said actuator and carrier, a first switch operated by said switch carrier and non-adjustable in respect thereto, a second switch, and an adjustable connection between said switch carrier and said second switch whereby the position of the actuator at which said second switch will be operated may be varied in respect to the position of the actuator at which the first switch will be operated.

2. In combination, a support, an expansible and contractible actuator responsive to changes in a physical condition, a controlled member positioned by the movements of one end of said actuator, adjusting means associated with said support and actuator for varying the value of the physical condition at which said controlled member will be moved to a given position by said actuator and a second controlled member associated with said adjusting means and operated to a new position upon operation of the adjusting means to one of its extreme positions.

3. In combination, a support, an expansible and contractible actuator responsive to changes in a physical condition, switching means positioned by the movements of one end of said actuator, adjusting means associated with said support and actuator for varying the value of the physical condition at which said controlled member will be moved to a given position by said actuator, a second switching means associated with said adjusting means and operated to one of its circuit controlling positions upon operation of the adjusting means to one of its extreme positions.

4. In combination, a support, an expansible and contractible actuator, a controlled member operated by one end of said actuator, means for adjusting the other end of said actuator in relation to said support, a second controlled member, and means associated with said second controlled member and said adjusting means for moving said second controlled member to a new position only upon movement of said adjusting means to a predetermined position.

5. In combination, an expansible and contractible actuator, a controlled member operated by one end thereof, a lever for adjusting the other end thereof, a second controlled member, means associated with said lever and second controlled member for moving the latter to a new position only when said lever has been moved to a predetermined position, and indicating means operated by the conjoint action of the first mentioned end of said actuator and said lever 6. In combination, a temperature responsive actuator, a two position controlling means normally operated to its two control positions thereby as a result of changes in the temperature to which said actuator responds, means for adjusting the temperature at which said controlling means is so operated, a second two position controlling means, and means associated with said second controlling means and said adjusting means for moving the latter to one of its control positions only when said adjusting means has been moved to such a position that normal changes in the temperature to which said actuator responds will be ineffective to operate said first control means from one of its control positions to its other control position.

7. In combination, a temperature responsive actuator, switching means normally operated to its two circuit controlling positions thereby as a result of changes in the temperature to which said actuator responds, means for adjusting the temperature at which said switching means is so operated, a second switching means, and means associated with said second switching means and said adjusting means for moving the former to one of its circuit controlling positions only when said adjusting means has been moved to such a position that normal changes in the temperature to which said actuator responds will be ineffective to operate said first switching means from one of its circuit controlling positions to its other circuit controlling position.

8. A switching mechanism of the class described, comprising, in combination, a support, a thermostatic switching mechanism carried thereby, a lever associated with said thermostatic switching mechanism for adjusting the temperature response of the same, and a switch carried by said support located in the path of movement of said lever whereby said switch is operated by said lever when the lever is moved to a predetermined position.

9. A switching mechanism of the class described, comprising, in combination, a support, a thermostatic element associated with said support, an actuator controlled by said thermostatic element, a switch carried by said actuator to be operated thereby, and a second switch carried by said support and located in the path of movement of said actuator to be operated thereby.

10. A switching mechanism of the class described, comprising, in combination, a support, a thermostatic element associated with said support, a lever associated with said thermostatic element for adjusting the response of the same, an actuator controlled by said thermostatic element, a first switch carried by said support and located in the path of movement of said actuator, and a second switch carried by said support and located in the path of movement of said adjusting lever.

11. In combination, a support provided with indicia, a lever pivoted to said support and cooperable with said indicia, a thermostatic element having one of its ends connected to said lever, an actuator connected to the other end of said thermostatic element, a pointer operated by said actuator, said lever being provided with indicia with which said pointer cooperates, a first switch carried by said support and located in the path of movement of said actuator, and a second switch carried by said support and located in the path of movement of said lever to be operated thereby when the lever is moved to a predetermined position.

12. A device of the class described, a condition responsive mechanism, a controlled member moved by said condition responsive mechanism in accordance with variations in the condition, a lever having a slot and indicia for adjusting said condition responsive mechanism to vary the value of the condition required to move said controlled element a predetermined amount, a pointer pivotally connected to said condition responsive mechanism and slideable in the slot in said lever and cooperable with the indicia thereon to indicate the value of the condition at all times irrespective of the adjustment of said condition responsive mechanism.

13. A device of the class described, comprising, in combination, an expansible and contractible actuator responsive to changes in a physical condition, a controlled member positioned by the movements of one end of said actuator, a lever for adjustably positioning the other end of said actuator to vary the value of the physical condition at which said controlled member will be moved to a predetermined position by said actuator, said lever being provided with a slot and indicia, a pointer pivotally connected to said actuator and having a portion slideable in the slot in said lever and cooperable with the indicia thereon to indicate the value of the physical condition at all times irrespective of the adjustment of said actuator.

14. In combination, a rotatably mounted actuating member, means responsive to a condition for rotating said actuating member, a lever for adjusting said actuating member, said lever being provided with a slot and indicia, an arm pivoted at one end of said actuating member and slidable at the other end in said slot, and a pointer operated by said arm for cooperating with the indicia.

15. In combination, a rotatably mounted actuating member, means responsive to a condition for rotating said actuating member, a lever for adjusting said actuating member, said lever being provided with a slot and indicia, and a pointer pivotally connected to said actuating member and slidable in said slot for cooperating with the indicia to indicate the value of the condition.

16. In combination, a support provided with indicia, a condition responsive mechanism mounted on said support, a controlled member moved by said condition responsive mechanism in accordance with variations in the condition, a lever for adjusting said condition responsive mechanism to vary the value of the condition required to move said controlled member a predetermined amount, said lever having a pointer cooperable with the indicia on said support to indicate the condition required to move said controlled member said predetermined amount, said lever also having a slot and indicia, a pointer connected to said condition responsive mechanism and slideable in the slot in said lever and cooperable with the indicia thereon to indicate the value of the condition at all times irrespective of the adjustment of said condition responsive mechanism.

17. In combination, a support provided with indicia, an expansible and contractible actuator responsive to changes in a physical condition, a controlled member positioned by the movements of one end of said actuator, a lever for adjustably positioning the other end of said actuator to vary the value of the physical condition at which said controlled member will be moved to a predetermined position by said actuator, said lever having a pointer cooperable with the indicia on said support to indicate the value of the physical condition at which said controlled member will be moved to a predetermined position by said actuator, said lever also having a slot and indicia, a pointer pivotally connected to said actuator and having a portion slideable in the slot in said lever and cooperable with the indicia thereon to indicate the value of the physical condition at all times irrespective of the adjustment of said actuator.

18. In combination, a support provided with indicia, a lever pivoted on said support and provided with an indicator for cooperating with the indicia on said support, a helically coiled bimetallic element having one of its ends connected to said lever, a torsion rod connected to the other end of said coiled bimetallic element and mounted concentrically with the pivotal point of said lever, an actuator secured to said torsion rod, said lever being provided with a slot and indicia, a pointer pivotally connected to said actuator at a point removed from the axis of said torsion rod and having a portion slidable in the slot in said lever and cooperable with the indicia thereon, and a switch operated by said actuator.

19. In combination, a support provided with indicia, a lever pivoted on said support and provided with an indicator for cooperating with the indicia on said support, a helically coiled bimetallic element having one of its ends connected to said lever, a torsion rod connected to the other end of said coiled bimetallic element and mounted concentrically with the pivotal point of said lever, an actuator secured to said torsion rod, said lever being provided with a slot and indicia, a pointer pivotally connected to said actuator at a point removed from the axis of said torsion rod and having a portion slidable in the slot in said lever, a switch operated by said actuator, and a second switch carried by said support and located in the path of movement of said lever.

20. In combination, a support provided with indicia, a lever pivoted on said support and provided with an indicator for cooperating with the indicia on said support, a helically coiled bimetallic element having one of its ends connected to said lever, a torsion rod connected to the other end of said coiled bimetallic element and mounted concentrically with the pivotal point of said lever, an actuator secured to said torsion rod, said lever being provided with a slot and indicia, a pointer pivotally connected to said actuator at a point removed from the axis of said torsion rod and having a portion slidable in the slot in said lever, a mercury switch mounted concentrically with said torsion rod, a lost motion connection between said mercury switch and actuator, a second switch mounted upon said support and located in the path of movement of said actuator, and a third switch mounted on said support and located in the path of movement of said lever.

JOHN P. KRIECHBAUM.